INVENTOR.
George R. Wepfer
BY Andrus & Sceales
ATTORNEYS.

Patented Jan. 5, 1954

2,665,363

UNITED STATES PATENT OFFICE 2,665,363

ELECTRODE MOTION

George R. Wepfer, Milwaukee, Wis., assignor to A. O. Smith Corporation, Milwaukee, Wis., a corporation of New York Application May 26, 1951, Serial No. 228,433

8 Claims. (Cl. 219—10)

This invention relates to a welding method and apparatus, and particularly to the formation of short arc welds such as are made in intermittent welding.

An object of the invention is to provide a welding method and apparatus whereby end craters are eliminated to produce welds having high stress resistance characteristics.

A further object is to provide a method and apparatus whereby the elimination of end craters is achieved without the necessity of having a dwell period prior to the cutting of the arc, so that the danger of burning through thin stock and thus ruining the workpiece is maintained at a minimum.

Another object of the invention is to provide means for making a weld between two metal objects which are spaced a slight distance from each other due to variations in the forming and assembly thereof.

The invention, in general, comprises striking an arc at one end of a relatively short predetermined line of welding and moving the arcing terminal of the electrode at a substantially uniform welding speed relative to the workpiece until the center portion of the weld line is reached. The arcing terminal is next skipped to the other end of the line of welding and then returned to its starting point at a non-uniform welding speed, which is initially less than the above-mentioned uniform speed, but which increases to a velocity greater than said uniform speed before the starting point is reached. In the apparatus for carrying out the method of the invention, means are provided for superimposing a generally circular motion on the oscillatory welding motion in order to improve the quality of the resulting weld, particularly in cases where a slight gap exists between the parts to be welded.

Other objects and advantages of the invention will be set forth more fully in the following description of the embodiment of the invention illustrated in the accompanying drawings.

Figure 1:
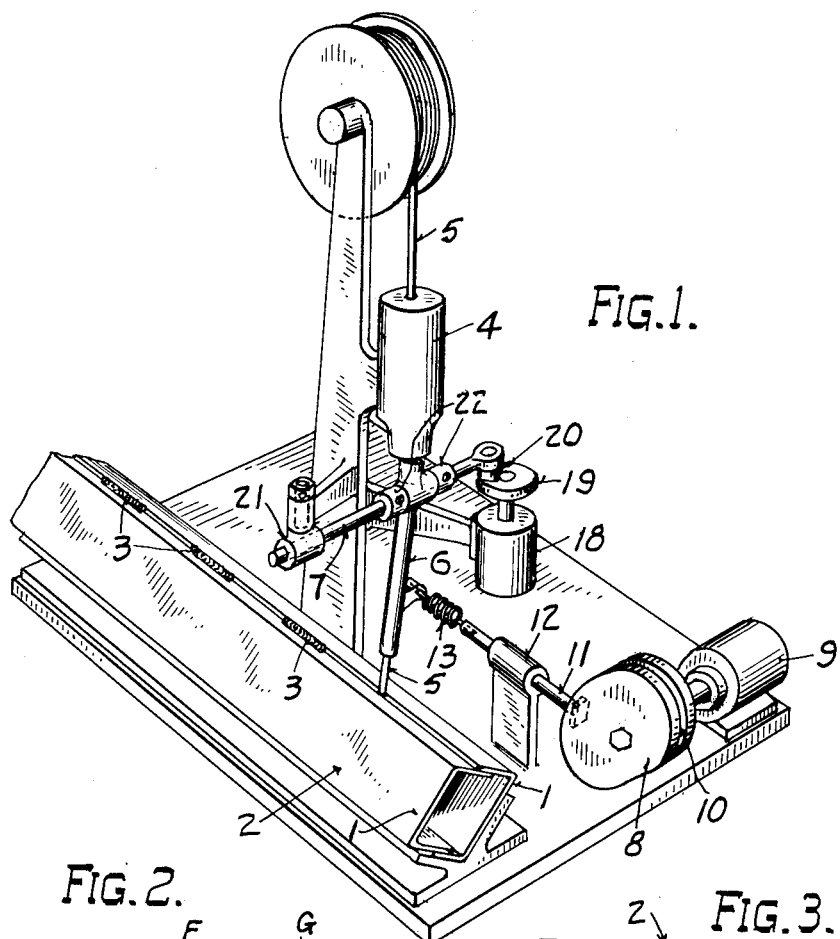
Figure 1 is a schematic perspective view of an apparatus for producing the desired electrode motions.
Figure 3:
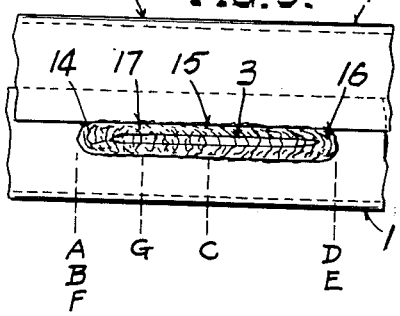
Fig. 3 is a detail view of a weld made under the invention, with the lettered points corresponding to the letters on the cam of Fig. 2.

Referring to Figs. 1 and 3 of the drawing, the invention is illustrated as employed in the intermittent arc welding of two channel bars 1 into a box member 2, with the flanges of the channels being overlapped a short distance for greater strength of the finished product. The fillet welds 3 which unite the channels are relatively short, for example, about two inches in length, and are made on a line of welding passing between the edge of an outer overlapped channel flange and the contiguous portion of the corresponding inner channel flange.

The apparatus employed in making the welds 3 comprises an automatic arc welding head, indicated generally at 4, which is suitably supported above the stationary table on which the work or channel bars 1 are secured. The head 4 is adapted to establish and maintain an arc of predetermined length between the arcing terminal of a bare wire electrode 5 and the work.

In order to guide and laterally move the electrode wire 5 after the same has passed from the reel on which it is wound and through the arc welding head, a generally vertical nozzle 6 is freely pivoted beneath the head for oscillation longitudinally of the line of welding. The mounting for the nozzle 6 includes a rod 7 which extends through the upper end of the nozzle transversely of the line of welding and forms part of a wiggle mechanism later to be described.

As shown in Fig. 1, the apparatus for oscillating the nozzle 6 to cause travel of the electrode terminal relative to the work comprises a cam 8 journalled laterally of the nozzle and driven by a suitable motor 9. The cam 8 is preferably constructed with a T slot 10 in the edge thereof to provide a positive drive for the correspondingly shaped tip of a cam follower rod 11. Rod 11 projects horizontally from the cam through a guide 12 and is connected via a spring 13 to an intermediate point on the electrode nozzle 6, with the spring 13 being relatively stiff but permitting the nozzle and electrode to wiggle, as will be set forth subsequently.

According to the invention, the contour of the cam 8 is such that the electrode 5 moved thereby is first caused to deposit a quantity of metal in the vicinity of one point on the line of welding, thereafter to deposit metal at a second point on the line of welding removed from the first deposited metal, and finally to fill in the space between the first and second points and complete the weld 3. With this procedure, both ends of the weld are formed free of craters without the necessity of having a dwell period prior to the cutting of the arc. Such a dwell period is customary in arc welding and frequently results in the overheating and burning of the base metal at the end of a bead, with consequent danger of creating burn holes in cases where the workpiece is thin.

Figure 2:
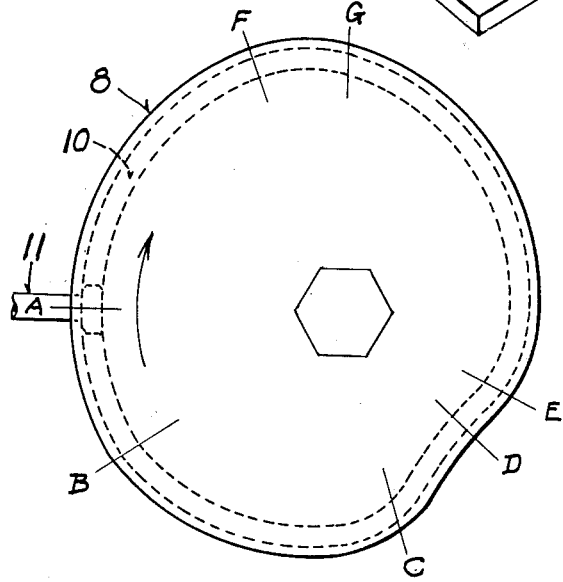
Fig. 2 is an enlarged plan view of the cam of Fig. 1.

Referring to Fig. 2, a particular contour of cam 8 is shown for making the weld 3 on a short line of welding, which may be about two inches in length and which forms part of the entire line of welding, the latter extending for the complete length of the channel bars 1. This contour of the cam may best be described by stating the effect which rotation of the cam has upon the electrode 5 controlled thereby.

Assuming that the cam 8 is initially in the position shown, with point A thereof in registry with the cam follower 11, the arcing terminal of electrode 5 will be at a point 14 (Fig. 3) at the left end of the short line of welding. At this point, the welding head 4 is operated to strike the arc, and the cam is rotated clockwise and at a uniform speed by the cam motor 9.

From point A to point B of the cam, the electrode 5 is made to dwell at point 14 in order to increase the initial deposition of metal. As soon as point B reaches the cam follower, the arcing terminal of the electrode is caused to travel to the right at a welding speed until an intermediate point 15 is reached, point 15 being preferably located at about the center of the short line of welding. The welding speed at which the electrode terminal travels is relatively uniform during this interval due to the constant slope of the cam from point B to point C, with the latter corresponding to point 15 on the welding line.

A generally uniform bead of metal having been deposited between points 14 and 15, the arcing terminal of the electrode is next moved in a non-welding manner to a point 16 on the right end of the short line of welding. This movement is preferably accomplished by skipping the electrode terminal at a velocity greater than welding speed but insufficient to cause extinguishment of the arc. The cam segment from C to D is designed to accomplish such a skipping movement without causing substantial heating or metal deposition between points 15 and 16.

Point 16 on the line of welding is removed a short distance from point 15 and is consequently relatively cool. Accordingly, after the electrode terminal reaches point 16 (corresponding to cam point D), the arc is either maintained or re-established by the welding head 4, and a dwell period is provided until cam point E reaches the cam follower. The dwell period insures good penetration into the cool metal and causes the right end of the weld 3 to be substantially identical in shape and properties to the left end thereof. If the point 16 were not relatively cool, any dwell period would create a danger of burn holes, and there would be an undesirable dissimilarity between the left and right ends of the weld.

During rotation of the cam 8 from point E to point F, relative to the cam follower 11, the arcing terminal of electrode 5 is returned at a welding speed along the line of welding from point 16 to point 14. The slope of the cam between points E and F is such that the speed of travel is initially less than the uniform speed at which the electrode travelled from point 14 to point 15, but becomes substantially greater than said uniform speed prior to the cutting of the arc. Starting at point 16, the initial return speed should be at least fifty per cent less than the uniform speed, whereas, after the intermediate point 15 is overlapped, the rate of travel should become at least fifty per cent greater than the uniform speed.

With such welding speeds of the arcing terminal in its return travel, a bead of metal is deposited between points 16 and 15, which is about the same thickness as the bead between points 14 and 15. The entire weld 3 is thus homogeneous and uniform, even though part of the weld is the result of one welding pass, and the remainder is the result of two welding passes.

The arc is cut as point 14 is approached by the electrode terminal in its return travel, for example, at point 17 on the line of welding corresponding to point G on the cam. It is important that the bead of metal deposited during travel of the electrode from point 14 to point 15 be overlapped before the welding current is turned off, since an earlier extinguishing of the arc would result in gaps and disuniformities in the weld.

Preparatory to the above-described welding operation, the assembled channel bars 1 are preferably turned relative to the electrode wire 5, so that the wire forms approximately a 60 degree angle with the face of the inner overlapped channel flange. Such an arc angle causes the adjoining parts of both channels to be evenly and uniformly melted during the welding operation.

In mass producing parts, such as the box members 2, however, this desired uniform melting is frequently lacking due to gaps existing between the assembled channel flanges. Such gaps may be the result of either improper assembly or of forming of the flanges at an incorrect angle.

In order to effect uniform melting of the work in spite of any gaps which may exist between the assembled parts, the invention comprises means for rapidly wiggling the electrode terminal transversely of the line of welding during the welding travel thereof. These means include a motor 18, which is supported beneath the mounting rod 7, and is adapted to drive an eccentric 19. The eccentric is operatively connected through a stud shaft 20 to a bearing in one end of the rod 7, so that rotation of eccentric 19 by motor 18 produces a corresponding eccentric motion in the rod.

A pivotally supported slide bearing 21 provided at the other end of the mounting shaft 7 serves to hold the shaft in position without interfering with the movement thereof caused by the eccentric. These movements are transmitted to the electrode nozzle 6, which is loosely pivoted on rod 7 by a pair of adjustable collars 22 mounted on rod 7 and on opposite sides of the nozzle. Accordingly, the cam movements of the nozzle and electrode are accompanied by a generally circular superimposed wiggle motion, with the exact path of the superimposed motion being determined by the position of the collars 22 and nozzle along rod 7.

The use of the described generally circular wiggle motion has been found to be highly satisfactory in that uniform melting of the work is produced without throwing of the filler metal to undesired locations. This is contrasted with non-circular motions, for example a superimposed oscillatory motion transverse to the line of welding, wherein the filler metal tends to be thrown out of the weld puddle as it leaves the arcing terminal of the electrode. This difference between circular and non-circular superimposed motions is believed to result from the fact that circular motions involve relatively little acceleration whereas linear motions involve constant transverse acceleration from a stopped condition and deceleration thereto.

The method of the invention, which may be performed either manually or with apparatus such as that described, comprises striking an arc at one point 14 on the line of welding and depositing a predetermined amount of filler metal in the region of said point. The electrode is next moved in a non-welding manner to a relatively cool point 16 on the welding line, after which it is returned at a welding speed to overlap the metal deposited around point 14 and complete the weld.

More particularly, the welding method comprises laying down a bead of metal from point 14 to an intermediate point 15 and then skipping the electrode terminal to point 16 at a speed greater than welding speed. The return travel from point 16 to point 14 is at a welding speed which is initially less than the speed at which the first bead portion was deposited, and which becomes substantially greater than said speed after point 15 is overlapped. The various welding speeds, dwell periods, superimposed wiggle motions, and other factors mentioned in connection with the functioning of the apparatus described above are equally applicable to the method of the invention.

The invention is particularly adapted to the intermittent arc welding of relatively thin parts such as automobile frames. With the invention, uniform high quality welds may be made under mass production conditions with neither end craters nor burn holes to impair the strength and appearance of the finished product.

Various embodiments of the invention may be employed within the scope of the following claims.

I claim:

1. In a method of making a short arc weld along a predetermined line of welding, the steps of providing an arc between the arcing terminal of an electrode and the work at a first point on said line of welding, maintaining said arc in the vicinity of said point for a period of time sufficient to permit the deposition of a substantial amount of metal therearound, moving said arcing terminal to a second point on said line of welding without depositing metal during said movement, said second point being spaced from said first point and being at a relatively cool portion of the work, and travelling said arcing terminal back along the line of welding until said deposited metal is reached, said return travel being at a welding speed relative to the work and effecting deposit of weld metal to provide with said first-named deposition of metal a crater-free continuous bead of deposited metal between said first and second points.

2. In a method of making a short arc weld along a predetermined line of welding, the steps of striking an arc between the arcing terminal of an electrode and the work at a first point on said line of welding, maintaining said arc in the vicinity of said point for a period of time sufficient to permit the deposition of a substantial amount of metal therearound, skipping said arcing terminal to a second point on said line of welding at a speed greater than welding speed relative to the work, said second point being spaced a short distance from said first point and deposited metal and at a relatively cool portion of the work, and travelling said arcing terminal back along the line of welding until said deposited metal is reached, said return travel being at a welding speed relative to the work and effecting deposit of metal to provide a crater-free continuous bead of deposited metal between said first and second points.

3. A method of making an arc weld along a predetermined line of welding, which comprises the steps of providing an arc between the arcing terminal of an electrode and the work at a first point on said line of welding, travelling said arcing terminal in a given direction along the line of welding and at a welding speed relative to the work to effect deposit of a bead of metal, skipping said arcing terminal in said given direction to a second point on said line of welding at a speed greater than welding speed relative to the work, said second point being spaced a short distance from the proximate end of said bead of metal and at a relatively cool portion of the work, and travelling said arcing terminal in the reverse direction along the line of welding until said bead of metal is overlapped, said return travel being at a welding speed relative to the work to effect deposit of metal and provide a crater-free continuous bead of deposited metal between said first and second points.

4. In a method of making an arc weld along a short line of welding, the steps of striking an arc between the arcing terminal of an electrode and the work at one end of said line of welding, travelling said arcing terminal relative to the work at a generally uniform welding speed until a point intermediate the ends of said line of welding is reached, moving said arcing terminal relative to the work in a non-welding manner to the other end of said line of welding, and returning said arcing terminal to said one end of the line of welding at a generally increasing welding speed relative to the work which is initially less than said uniform welding speed and which becomes greater than said uniform welding speed before said one end is reached, said method effecting crater elimination without dwelling on heated metal and minimizing likelihood of creating burn holes in thin work.

5. A method of making an arc weld along a short line of welding, which comprises striking an arc between the arcing terminal of an electrode and the work at one end of said line of welding, travelling said arcing terminal at a generally uniform welding speed until a point approximately midway between the ends of said line of welding is reached, skipping said arcing terminal to the other end of said line of welding at a speed greater than welding speed, and returning said arcing terminal to said one end of said line of welding at a welding speed which is initially less than said uniform welding speed and which becomes at least fifty per cent greater than said uniform welding speed before said one end is reached, said method effecting end crater elimination without the necessity of dwelling on heated metal and minimizing the danger of creating burn holes in thin work.

6. Apparatus for making an arc weld along a relatively short line of welding, comprising an automatic arc welding head adapted to establish and maintain an arc of predetermined length between the arcing terminal of an electrode and the work to be welded, means for travelling said arcing terminal at a welding speed relative to the work from one end of said line of welding to a point intermediate the ends thereof, means for moving said arcing terminal to the other end of said line of welding without depositing substantial amounts of metal during said movement, and means for travelling said arcing terminal back along said line of welding at a welding speed relative to the work, said last mentioned means being adjusted to effect said return welding movement to continue at least until said intermediate point is reached.

7. Apparatus for making an arc weld along a relatively short line of welding, comprising an automatic arc welding head adapted to establish and maintain an arc of predetermined length between the arcing terminal of an electrode and the work to be welded, means for travelling said arcing terminal at a generally uniform welding speed from one end of said line of welding to a point approximately midway between the ends thereof, means for skipping said arcing terminal at a speed greater than welding speed to the other end of said line of welding, and means for travelling said arcing terminal back along said line of welding at a welding speed which is initially substantially less than said uniform welding speed and which becomes greater than said uniform welding speed after said midway point is overlapped.

8. Apparatus for making a relatively short arc weld along a predetermined line of welding, which comprises an automatic arc welding head adapted to establish and maintain an arc between the arcing terminal of an electrode and the work to be welded, a cam operatively associated with said electrode to cause movement of said arcing terminal along the line of welding, said cam being contoured to a shape adapted first to cause said arcing terminal to travel at a welding speed from one end of said line of welding to a point intermediate the ends thereof, thereafter to cause said arcing terminal to skip to the other end of said line of welding without effecting welding during said movement, said other end being removed from said intermediate point and in a relatively cool condition, and finally to cause said arcing terminal to travel back along said line of welding at a generally increasing welding speed until said intermediate point is overlapped a substantial distance.

GEORGE R. WEPFER.

References Cited in the file of this patent

UNITED STATES PATENTS

| Number | Name | Date |
|---|---|---|
| 467,752 | Howard | Jan. 26, 1892 |
| 1,949,251 | Gilbert | Feb. 27, 1934 |
| 2,466,497 | Smith | Apr. 5, 1949 |
| 2,472,803 | Beyer | June 14, 1949 |